(12) United States Patent
Barbour

(10) Patent No.: US 11,727,597 B2
(45) Date of Patent: *Aug. 15, 2023

(54) CALIBRATING VOLUMETRIC RIG WITH STRUCTURED LIGHT

(71) Applicants: SONY GROUP CORPORATION, Tokyo (JP); SONY PICTURES ENTERTAINMENT INC., Culver City, CA (US)

(72) Inventor: Scot Barbour, Culver City, CA (US)

(73) Assignees: Sony Group Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/714,453

(22) Filed: Dec. 13, 2019

(65) Prior Publication Data

US 2020/0202571 A1 Jun. 25, 2020

Related U.S. Application Data

(60) Provisional application No. 62/784,249, filed on Dec. 21, 2018.

(51) Int. Cl.
G06T 7/80 (2017.01)
G06T 7/70 (2017.01)
H04N 17/00 (2006.01)

(52) U.S. Cl.
CPC ............... *G06T 7/80* (2017.01); *G06T 7/70* (2017.01); *H04N 17/002* (2013.01)

(58) Field of Classification Search
CPC ........... G06T 7/70; G06T 7/80; H04N 17/002; H04N 5/247
See application file for complete search history.

(56) References Cited

U.S. PATENT DOCUMENTS

| | | | |
|---|---|---|---|
| 6,985,175 B2 * | 1/2006 | Iwai | G01C 11/06 348/E13.016 |
| 7,428,482 B2 * | 9/2008 | Clavadetscher | H04N 13/275 703/6 |
| 8,818,132 B2 * | 8/2014 | Zhang | H04N 17/002 382/289 |
| 9,108,571 B2 * | 8/2015 | Bort | G01S 5/16 |
| 9,229,526 B1 * | 1/2016 | Neglur | G06F 15/76 |
| 9,313,391 B1 * | 4/2016 | Zhang | H04N 5/247 |
| 9,467,680 B2 * | 10/2016 | Kimmel | H04N 5/33 |
| 9,503,703 B1 * | 11/2016 | Ramaswamy | H04N 13/246 |
| 9,794,454 B2 * | 10/2017 | Uri | H04N 23/51 |
| 9,794,545 B2 * | 10/2017 | Bronstein | H04N 13/25 |

(Continued)

FOREIGN PATENT DOCUMENTS

| CN | 107633537 A | 1/2018 |
|---|---|---|
| CN | 107945268 A | 4/2018 |

*Primary Examiner* — Brian P Yenke
(74) *Attorney, Agent, or Firm* — Procopio, Cory, Hargreaves & Savitch LLP

(57) ABSTRACT

Calibrating cameras in a rig, including: projecting light patterns onto surfaces of objects in a capture volume; capturing image data of the light patterns projected onto the surfaces of the objects using the cameras; and processing the captured image data to estimate a calibration data of the cameras, wherein processing the image data to estimate the calibration data includes measuring distortions in the light patterns.

17 Claims, 4 Drawing Sheets

(56) References Cited

U.S. PATENT DOCUMENTS

| | | | | |
|---|---|---|---|---|
| 9,819,929 | B2* | 11/2017 | Kimmel | H04N 13/296 |
| 9,978,147 | B2* | 5/2018 | Raniwala | H01S 5/183 |
| 10,027,950 | B2* | 7/2018 | Kimmel | H04N 5/357 |
| 10,127,687 | B2* | 11/2018 | Matsuzawa | G06T 7/80 |
| 10,187,629 | B2* | 1/2019 | Cabral | H04N 13/332 |
| 10,499,045 | B2* | 12/2019 | Sommerlade | H04N 17/002 |
| 10,713,810 | B2* | 7/2020 | Furihata | H04N 5/247 |
| 10,719,956 | B2* | 7/2020 | Nakano | H04N 17/002 |
| 10,891,756 | B2* | 1/2021 | Oyaizu | G06T 7/60 |
| 10,999,487 | B2* | 5/2021 | Kashiwa | H04N 5/765 |
| 11,017,585 | B1* | 5/2021 | Toksvig | H04N 5/2224 |
| 11,212,456 | B2* | 12/2021 | Barbour | H04N 23/56 |
| 11,232,595 | B1* | 1/2022 | Momcilovic | H04N 17/002 |
| 11,259,013 | B2* | 2/2022 | Ma | H04N 23/60 |
| 11,282,231 | B2* | 3/2022 | Barbour | H04N 23/90 |
| 11,481,926 | B2* | 10/2022 | Johnson | G06K 7/10722 |
| 11,538,193 | B2* | 12/2022 | Dworakowski | H04N 17/002 |
| 2004/0170315 | A1* | 9/2004 | Kosaka | G06T 5/006 382/154 |
| 2004/0179228 | A1* | 9/2004 | McCluskey | H04N 1/32133 358/1.15 |
| 2008/0062164 | A1* | 3/2008 | Bassi | H04N 9/3147 345/214 |
| 2010/0134516 | A1* | 6/2010 | Cooper | G06T 15/04 345/592 |
| 2010/0329538 | A1* | 12/2010 | Remillard | G06T 7/521 382/141 |
| 2011/0128388 | A1* | 6/2011 | Pai | G06T 7/80 348/187 |
| 2012/0094754 | A1* | 4/2012 | Suzuki | A63F 13/5258 463/30 |
| 2013/0124471 | A1* | 5/2013 | Chen | H04N 5/247 707/624 |
| 2013/0201326 | A1* | 8/2013 | Tsujii | G01C 11/02 348/135 |
| 2013/0253754 | A1* | 9/2013 | Ferguson | B60W 30/18154 701/28 |
| 2014/0118557 | A1* | 5/2014 | Lee | G06T 7/80 348/175 |
| 2015/0172539 | A1* | 6/2015 | Neglur | H04N 5/23219 348/207.1 |
| 2015/0172635 | A1* | 6/2015 | Kimmel | H04N 13/296 348/51 |
| 2015/0302648 | A1* | 10/2015 | Zhang | G01B 11/2513 345/426 |
| 2016/0119541 | A1* | 4/2016 | Alvarado-Moya | G06T 3/0018 348/38 |
| 2016/0134851 | A1* | 5/2016 | Grundhofer | H04N 9/3194 348/745 |
| 2017/0070731 | A1* | 3/2017 | Darling | G06T 7/85 |
| 2017/0103509 | A1* | 4/2017 | Scharfenberger | H04N 17/002 |
| 2017/0186146 | A1* | 6/2017 | Raniwala | H04N 13/25 |
| 2017/0249386 | A1* | 8/2017 | Ostrovsky-Berman | G06F 16/951 |
| 2017/0295358 | A1 | 10/2017 | Cabral et al. | |
| 2018/0374227 | A1* | 12/2018 | Varekamp | G06T 7/586 |
| 2019/0147625 | A1* | 5/2019 | Jia | G06T 7/80 348/187 |
| 2019/0230347 | A1* | 7/2019 | Itoh | H04N 5/2354 |
| 2019/0339369 | A1* | 11/2019 | Fenton | G01S 17/894 |
| 2019/0342543 | A1* | 11/2019 | Li | G06T 7/74 |
| 2019/0364206 | A1* | 11/2019 | Dal Mutto | G06T 7/80 |
| 2019/0364265 | A1* | 11/2019 | Matsunobu | H04N 13/279 |
| 2020/0160106 | A1* | 5/2020 | Sivalingam | G06K 9/6256 |
| 2020/0202570 | A1* | 6/2020 | Barbour | G06T 7/80 |
| 2020/0204720 | A1* | 6/2020 | Barbour | G06T 7/73 |
| 2020/0394813 | A1* | 12/2020 | Theverapperuma | E02F 3/437 |
| 2020/0410650 | A1* | 12/2020 | Yamazaki | G06T 7/80 |
| 2021/0027492 | A1* | 1/2021 | Lovegrove | G06T 7/80 |
| 2021/0142517 | A1* | 5/2021 | Jia | H04N 17/002 |
| 2021/0183101 | A1* | 6/2021 | Oryoji | H04N 5/247 |
| 2022/0148225 | A1* | 5/2022 | Myokan | H04N 25/61 |
| 2022/0198768 | A1* | 6/2022 | Tezaur | H04N 5/2628 |
| 2022/0392105 | A1* | 12/2022 | Bramlett | G06V 10/25 |
| 2022/0414931 | A1* | 12/2022 | Muhassin | G06T 7/80 |
| 2023/0027236 | A1* | 1/2023 | Borovsky | G06T 7/70 |
| 2023/0077539 | A1* | 3/2023 | Gromotka | G06T 17/00 |

* cited by examiner

CALIBRATING VOLUMETRIC RIG WITH STRUCTURED LIGHT

CROSS-REFERENCE TO RELATED APPLICATIONS

This application claims the benefits of priority under 35 U.S.C. § 119(e) of U.S. Provisional Patent Application No. 62/784,249, filed Dec. 21, 2018, entitled "Structured Light for Calibrating Volumetric Rig." The disclosure of the above-referenced application is incorporated herein by reference.

BACKGROUND

Field

The present disclosure relates to calibrating cameras, and more specifically, to calibrating cameras in the volumetric rig with patterned light.

Background

Camera calibration may involve estimating the parameters of a lens and image sensor of an image or video camera. These parameters may be used to correct for lens distortion, measure the size of an object, or determine the location of the camera in the scene. However, estimating these parameters may be difficult.

SUMMARY

The present disclosure provides for calibrating cameras in the volumetric rig with patterned light.

In one implementation, a method for calibrating cameras in a rig is disclosed. The method includes: projecting light patterns onto surfaces of objects in a capture volume; capturing image data of the light patterns projected onto the surfaces of the objects using the cameras; and processing the captured image data to estimate a calibration data of the cameras, wherein processing the image data to estimate the calibration data includes measuring distortions in the light patterns.

In one implementation, projecting the light patterns includes: projecting the light patterns during primary capture segments to capture video image data; and projecting the light patterns during secondary capture segments to estimate the calibration data of the cameras. In one implementation, the calibration data includes changes in camera position based on distortions in the captured image data of the light pattern. In one implementation, the method further includes measuring camera angles relative to surface changes using the distortions in the captured image data. In one implementation, the light patterns include checkerboard patterns. In one implementation, the method further includes identifying source cameras using the captured image data. In one implementation, the light patterns projected onto the surfaces of the objects are non-visible light patterns.

In another implementation, an image capture system is disclosed. The system includes: a plurality of light sources configured to project light patterns onto surfaces of objects in a capture volume; a plurality of image sensors configured to capture image data of the light patterns projected onto the surfaces of the objects by the plurality of light sources; and a processor configured to process the image data captured by the plurality of image sensors to estimate a calibration data for the plurality of image sensors.

In one implementation, the calibration data includes changes in sensor position based on distortions in the captured image data of the light pattern. In one implementation, the distortions in the captured image data are used to measure angles of the plurality of sensors relative to surface changes. In one implementation, the light patterns comprise checkerboard patterns. In one implementation, the light patterns projected onto the surfaces of the objects are non-visible light patterns. In one implementation, the image data identifies source information about which sensor of the plurality of sensor is providing the image data. In one implementation, the source information and the image data are used to determine parameters of the plurality of sensors. In one implementation, the parameters include positions, orientations, and image settings of the plurality of sensors. In one implementation, the calibration data for the plurality of image sensors is estimated from the parameters. In one implementation, the parameters include at least one of sensor types, sensor configurations, and lens information. In one implementation, the plurality of sensors includes a plurality of camera. In one implementation, the plurality of sensors includes a plurality of audio sensors. In one implementation, the plurality of sensors includes a plurality of thermal sensors.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, camera calibration may involve estimating the parameters of a lens and image sensor of an image or video camera, which are used to correct for lens distortion or determine the location of the camera in the scene. However, estimating these parameters may be difficult.

Certain implementations of the present disclosure provide for estimating the parameters of the cameras of a volumetric rig by implementing a technique for calibrating the cameras. After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Features provided in implementations can include, but are not limited to, one or more of the following items: Project patterns of light into a capture volume using controlled light source; Capture images of the patterns of light projected onto surfaces in the capture volume using the cameras; and Deriving information about the cameras including camera positions and orientations by analyzing the image data for the captured images.

Figure 1:
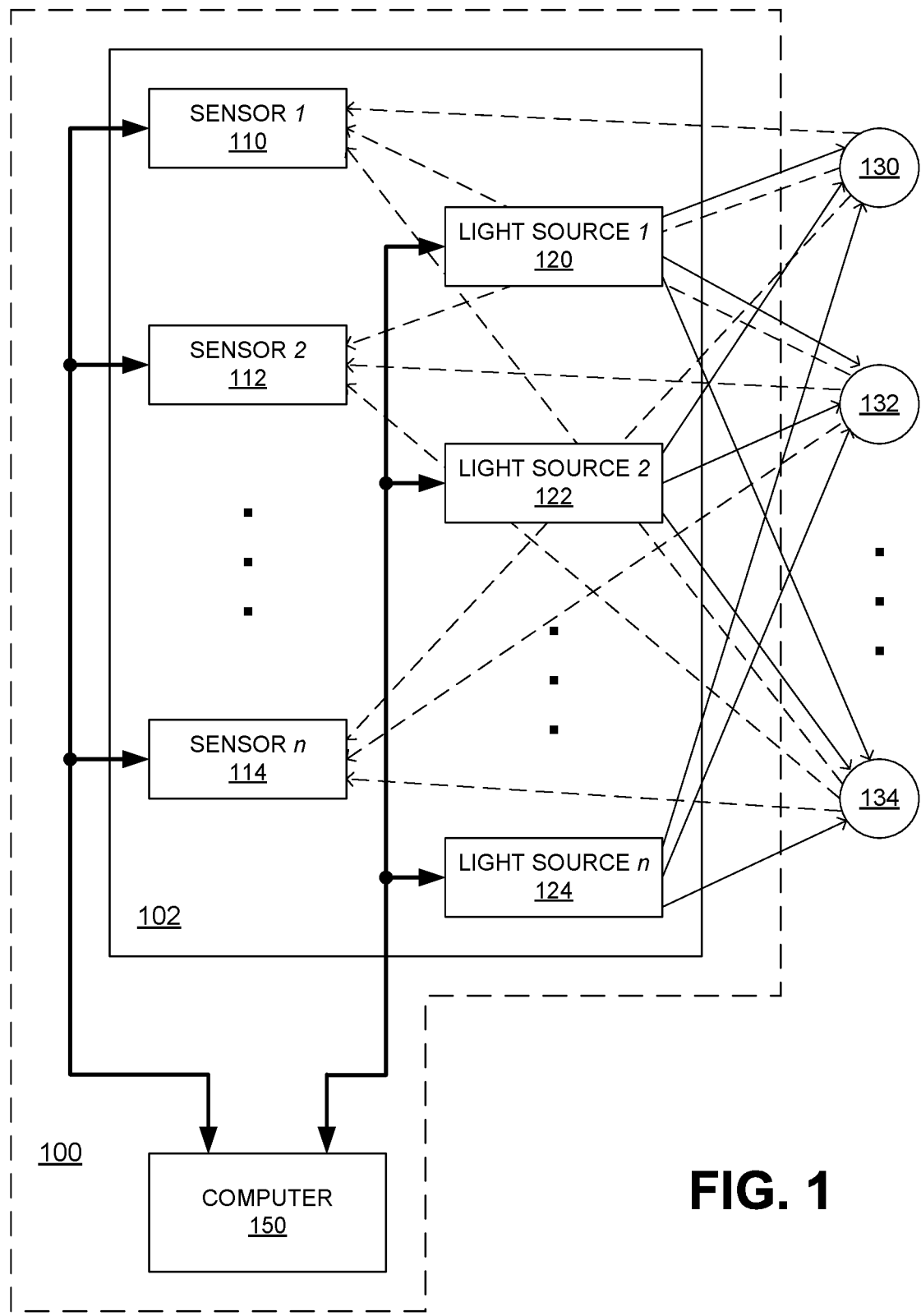
FIG. 1 is a block diagram of a system for calibrating sensors (e.g., cameras) of a camera rig using structured or patterned light in accordance with one implementation of the present disclosure.

FIG. 1 is a block diagram of a system 100 for calibrating sensors (e.g., cameras) of a camera rig using structured or patterned light in accordance with one implementation of the present disclosure. In the illustrated implementation of FIG. 1, the system 100 includes a camera rig 102 having a plurality of sensors 110, 112, 114 and a plurality of light sources 120, 122, 124 which are used to capture calibration data. The system 100 also includes a processor 150 (e.g., a server computer) coupled to the sensors 110, 112, 114 and the light sources 120, 122, 124 to control their operation and send and receive data.

In one implementation, the camera rig 102 for 3-D video capture includes at least two image sensors, a visible light sensor 110 (e.g., a red-green-blue (RGB) sensor) and an infrared (IR) sensor 112. In this implementation, the two sensors are overlapping and have a common center line through a single lens. The camera rig 102 also includes at least two light sources, a visible light source 120 and an IR source 122 (or the light sources can be external to the rig).

In one implementation, the light sources 120, 122, 124 are configured to illuminate objects and/or people 130, 132, 134 within a capture volume. In one implementation, the visible light source 120 is configured to project visible light for image capture, while the IR source 122 is configured to project structured or patterned IR beam for additional information capture including information needed for calibration of the sensors 110, 112, 114. Further, the visible light sensor 110 is configured to capture video image data of the visible light, while the IR sensor 112 is configured to capture IR calibration pattern projected by the IR source 122. In one implementation, the video image data is captured during primary capture segments, while the calibration data is captured during secondary capture segments.

In one implementation, the IR source 122 projects patterned IR beam, such as checkerboard patterns. Further, the IR sensor 112 captures image data of the projection of the checkerboard patterns onto the surfaces of the objects and/or people 130, 132, 134 as the secondary image capture. In one implementation, the processor 150 processes the secondary image capture to obtain calibration data used for camera calibration. By using two aligned image sensors, the calibration variables are reduced and calibration can be more efficient. Thus, in this implementation, the processor 150 processes the secondary image capture to obtain information about the cameras/sensors, such as changes in camera/sensor positions based on changes in the image data for the projected checkerboard patterns (e.g., changes in the distortion of the checkerboard patterns as the camera angle relative to the surface changes).

Figure 2:
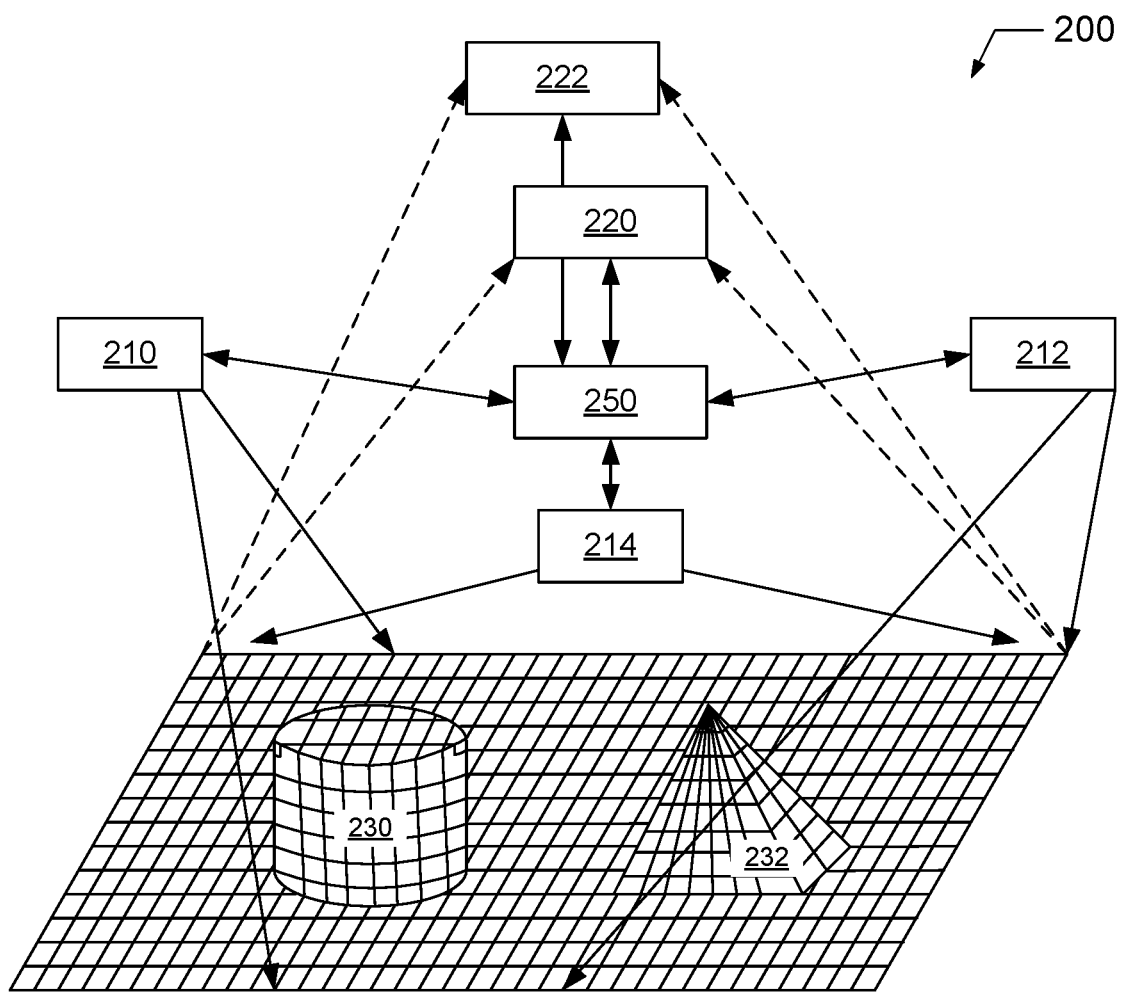
FIG. 2 is a block diagram of an image capture system in accordance with one implementation of the present disclosure.

FIG. 2 is a block diagram of an image capture system 200 in accordance with one implementation of the present disclosure. In the illustrated implementation of FIG. 2, the capture system 200 includes a plurality of light sources 210, 212, 214 and a plurality of image sensors 220, 222. As described above, the plurality of light sources 210, 212, 214 can include primary light sources 214 for lighting objects or people for video capture and patterned light sources 210, 212 for the secondary capture. The system 200 also includes a processor 250 coupled to the sensors 220, 222 and the light sources 210, 212, 214 to control their operation, as well as process, send, and receive data.

In one implementation, the patterned light sources 210, 212, 214 are configured to project light using calibration light patterns, such as a checkerboard pattern shown in FIG. 2, onto known surfaces in a capture volume (e.g., furniture). The image sensors 220, 222 capture image data of the projection of the checkerboard patterns onto the surfaces of objects 230, 232 (in the capture volume) for the secondary image capture. The processor 250 uses the image data captured during the secondary image capture to determine parameters of the sensors 220, 222. In one implementation, distortions in the light patterns are used to estimate the camera parameters, which are then used to calibrate the sensors/cameras. Thus, in one example, the camera parameters include changes in camera position estimated based on changes or distortions in the image data for the projected checkerboard patterns (e.g., changes in the distortion of the checkerboard patterns as the camera angle relative to the surface changes).

In the illustrated implementation of FIG. 2, the patterns are projected according to instructions or data from the processor 250. The cameras 220, 222 capture images of the projected light patterns and provide image data back to the processor 250. The image data identifies the source camera for the data. The processor 250 can then use the image data and the source information to determine the parameters/attributes for the cameras, including position, orientation, and image settings of the cameras (i.e., the camera data/attributes). The processor 250 uses the camera attributes to establish the calibration for the cameras.

In an alternative implementation, the cameras provide camera parameters along with image data, including a camera type, sensor configuration, lens information, GPS data, gyroscope or accelerometer data. The cameras can be fixed or moving. In one implementation, the camera movement and the movement pattern are derived as calibration. Other types of sensors can be used with or instead of cameras, such as audio or thermal sensors.

In another alternative implementation, light sources and image sensors are for visible or non-visible light (e.g., infrared (IR)). The light patterns can be spatial patterns (e.g., lines, checkerboard, dot patterns, or known noise patterns), color or brightness patterns, or patterns that move or vary over time. In one implementation, the light sources can project light to form common patterns or different respective patterns.

In another alternative implementation, the known surface of the capture volume for light projection is the floor of a defined space in the capture volume. In yet another alternative implementation, additional object surfaces are also used in the capture volume, such as objects with known geometries and characteristics placed at known locations and positions in the capture volume. In yet another alternative implementation, surface characteristics in addition to the projected light patterns are used for the image capture, such as printed patterns.

In yet another alternative implementation, one or more computers form one or more servers in a local, distributed, remote, or cloud network, or a combination. Additional calibration information can be collected and new calibration data updated over time, such as using infrared (IR) sensors capturing IR light projected during or between capture of video images (frames).

The above-described implementations are used in applications including 3-D scene reconstruction, video capture rig for content production, virtual reality, motion capture, or other applications such as live event capture, ad hoc network of mobile phones, and/or medical imaging.

Figure 3:
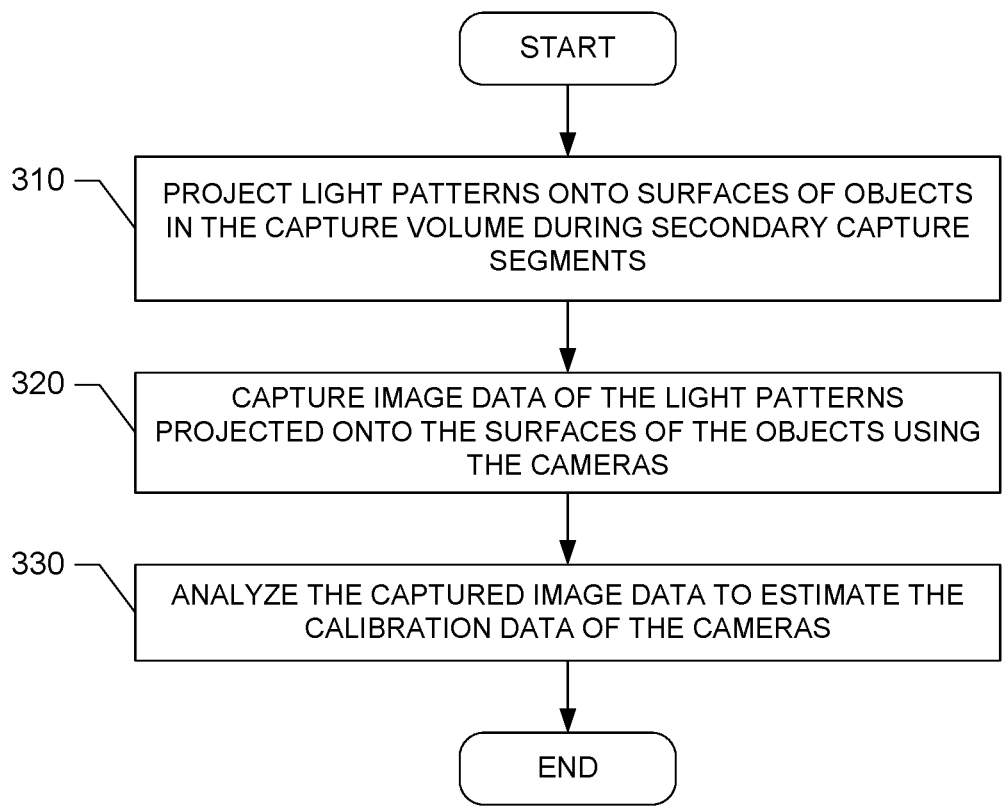
FIG. 3 is a flow diagram of a process for calibrating cameras in accordance with one implementation of the present disclosure.

FIG. 3 is a flow diagram of a process 300 for calibrating cameras in accordance with one implementation of the present disclosure. In the illustrated implementation of FIG. 3, light patterns are projected onto surfaces of objects in the capture volume, at block 310. In one implementation, the patterned light sources project light using a calibration light pattern, such as a checkerboard. In one implementation, the light patterns are projected during secondary capture segments.

At block 320, the cameras capture the image data of the light patterns projected onto the surfaces of the objects. The captured image data is then analyzed and/or processed, at block 330, to estimate the calibration data of the cameras. In one implementation, the calibration data includes changes in camera position based on changes in the image data for the projected checkerboard patterns (e.g., changes in the distortion of the checkerboard patterns as the camera angle relative to surface changes).

Figure 4A:
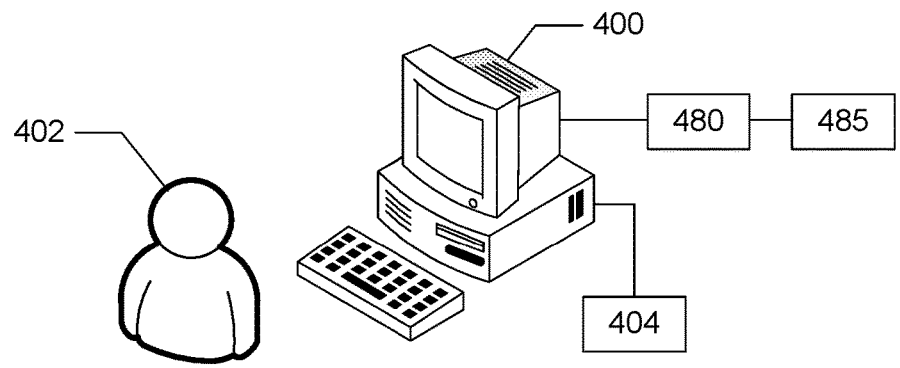
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a calibration application 490 as illustrated and described with respect to the computer 150 in the system 100 of the block diagram shown in FIG. 1 and the process 300 illustrated in FIG. 3.

Figure 4B:
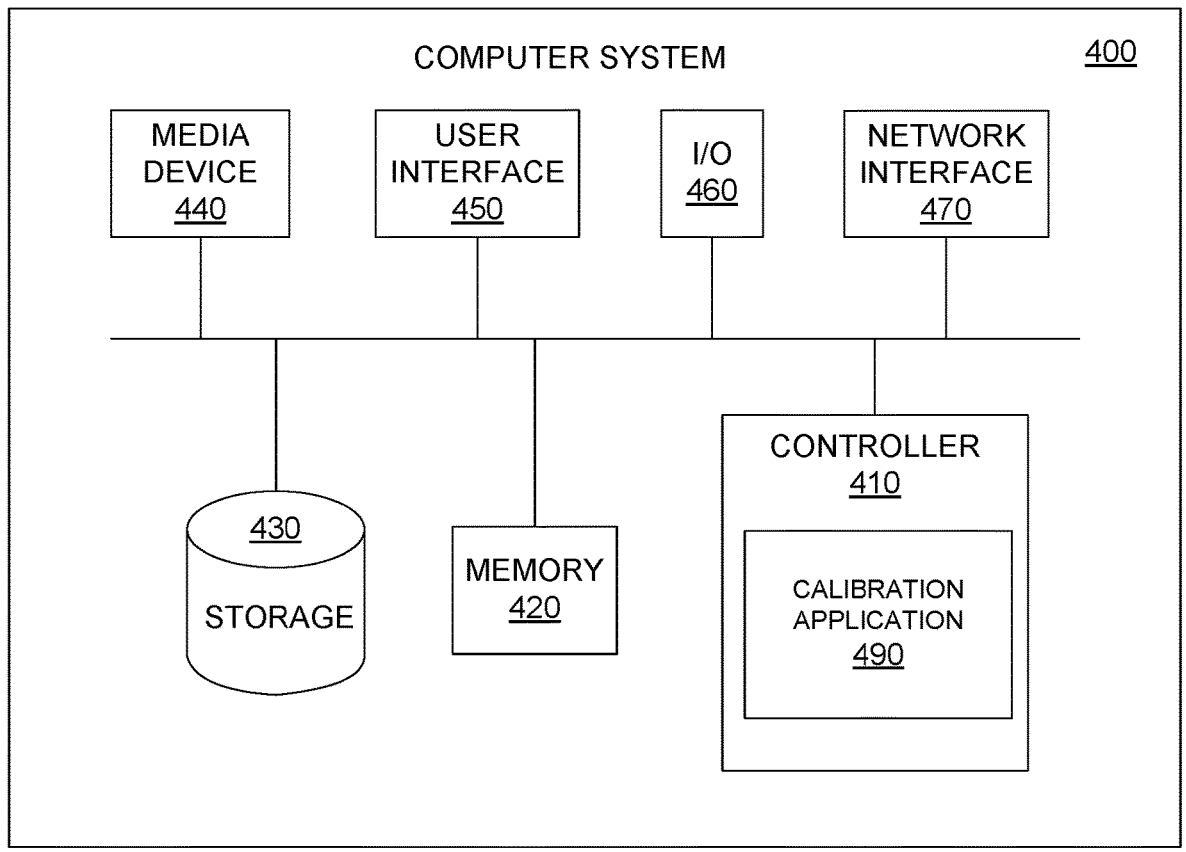
FIG. 4B is a functional block diagram illustrating the computer system hosting the calibration application 490 in accordance with an implementation of the present disclosure.

The computer system 400 stores and executes the calibration application 490 of FIG. 4B. In addition, the computer system 400 may be in communication with a software program 404. Software program 404 may include the software code for the calibration application. Software program 404 may be loaded on an external medium such as a CD, DVD, or a storage drive, as will be explained further below.

Furthermore, computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the calibration application. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the calibration application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the calibration application 490 with a software system, such as to enable the creation and configuration of engines and data extractors within the calibration application. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of computer system 400. For example, storage 430 stores data used by the calibration application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above-described implementations are used in applications including camera systems for entertainment content, movies, television, personal use, games, security video, and medical imaging.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for calibrating cameras in a rig, the method comprising:
    projecting light patterns onto surfaces of objects in a capture volume;
    capturing image data of the light patterns projected onto the surfaces of the objects using the cameras; and
    processing the captured image data to estimate a calibration data of the cameras; and
    measuring distortions in the light patterns using the estimated calibration data of the cameras as camera angles relative to changes on the surfaces of the objects,
    wherein the measured distortions in the light patterns of the captured image data identifies source information about which camera of the cameras is providing the image data.

2. The method of claim 1, wherein projecting the light patterns comprises:
    projecting the light patterns during primary capture segments to capture video image data; and
    projecting the light patterns during secondary capture segments to estimate the calibration data of the cameras.

3. The method of claim 1, wherein the calibration data includes changes in camera position based on the distortions in the captured image data of the light pattern.

4. The method of claim 1, wherein the light patterns comprise checkerboard patterns.

5. The method of claim 1, further comprising
    identifying source cameras using the captured image data.

6. The method of claim 1, wherein the light patterns projected onto the surfaces of the objects are non-visible light patterns.

7. An image capture system, comprising:
    a plurality of light sources configured to project light patterns onto surfaces of objects in a capture volume;
    a plurality of sensors configured to capture image data of the light patterns projected onto the surfaces of the objects by the plurality of light sources; and
    a processor configured to process the image data captured by the plurality of sensors to estimate a calibration data for the plurality of sensors, and to measure distortions in the light patterns using the estimated calibration data of the sensors as angles of the plurality of sensors relative to changes on the surfaces of the objects,
    wherein the measured distortions in the light patterns of the image data identifies source information about which sensor of the plurality of image sensors is providing the image data.

8. The system of claim 7, wherein the calibration data includes changes in sensor position based on the distortions in the captured image data of the light pattern.

9. The system of claim 7, wherein the light patterns comprise checkerboard patterns.

10. The system of claim 7, wherein the light patterns projected onto the surfaces of the objects are non-visible light patterns.

11. The system of claim 7, wherein the source information and the image data are used to determine parameters of the plurality of sensors.

12. The system of claim 11, wherein the parameters comprise positions, orientations, and image settings of the plurality of sensors.

13. The system of claim 11, wherein the calibration data for the plurality of sensors is estimated from the parameters.

14. The system of claim 11, wherein the parameters comprise
    at least one of sensor types, sensor configurations, and lens information.

15. The system of claim 7, wherein the plurality of sensors comprises a plurality of cameras.

16. The system of claim 7, wherein the plurality of sensors comprises a plurality of audio sensors.

17. The system of claim 7, wherein the plurality of sensors comprises a plurality of thermal sensors.

* * * * *